United States Patent [19]

Niiro et al.

[11] 4,432,605

[45] Feb. 21, 1984

[54] OPTICAL FIBER SUBMARINE CABLE

[75] Inventors: Yasuhiko Niiro, Yokohama; Yoshihiro Ejiri, Tokyo, both of Japan

[73] Assignee: Kokusai Denshin Denwa Kabushiki Kaisha, Tokyo, Japan

[21] Appl. No.: 259,529

[22] Filed: May 1, 1981

Related U.S. Application Data

[63] Continuation of Ser. No. 24,674, Mar. 28, 1979, abandoned.

[30] Foreign Application Priority Data

Apr. 11, 1978 [JP] Japan .................................. 53-41703

[51] Int. Cl.³ .............................................. G02B 5/16
[52] U.S. Cl. ..................................................... 350/96.23
[58] Field of Search ........................... 174/70 R, 70 S; 350/96.23

[56] References Cited

U.S. PATENT DOCUMENTS

| | | | |
|---|---|---|---|
| 3,766,307 | 10/1973 | Andrews, Jr. ................. | 350/96.23 X |
| 4,097,119 | 6/1978 | Kumamaru et al. ............ | 350/96.23 |
| 4,100,008 | 7/1978 | Claypoole ..................... | 350/96.23 X |
| 4,110,001 | 8/1978 | Olszewski et al. ............. | 350/96.23 |
| 4,146,302 | 3/1979 | Jachimowicz .................. | 350/96.23 |
| 4,147,407 | 4/1979 | Eichenbaum et al. ......... | 350/96.23 X |
| 4,156,104 | 5/1979 | Mondello ....................... | 174/70 R |
| 4,160,872 | 7/1979 | Lundberg et al. .............. | 350/96.23 X |
| 4,181,815 | 1/1980 | Lundberg et al. .............. | 174/70 R |
| 4,239,336 | 12/1980 | Parfree et al. .................. | 350/96.23 |

FOREIGN PATENT DOCUMENTS

| | | | |
|---|---|---|---|
| 2505319 | 8/1976 | Fed. Rep. of Germany ... | 350/96.23 |
| 2507649 | 9/1976 | Fed. Rep. of Germany ... | 350/96.23 |
| 2820510 | 11/1978 | Fed. Rep. of Germany ... | 350/96.23 |
| 2265108 | 10/1975 | France ............................ | 350/96.23 |
| 1172272 | 11/1969 | United Kingdom ............ | 350/96.23 |

OTHER PUBLICATIONS

"GTE to Install Fiber Link in Fort Wayne ...", *Laser Focus*, vol. 14, No. 11, Nov. 1978, p. 54.

*Primary Examiner*—John D. Lee
*Assistant Examiner*—Frank González
*Attorney, Agent, or Firm*—Robert E. Burns; Emmanuel J. Lobato; Bruce L. Adams

[57] ABSTRACT

An optical fiber submarine cable, in which a multilayer, cylindrical pressure resisting layer is prepared so as to have a construction in that at least one optical fiber layer is successively covered by a cushion layer and a rounded layer of a first tape of a good electric conductor member, a longitudinal joint of side edges of the first tape is welded, at least one second tape of a good electric conductor material is closely coated on the layer of the first tape by the use of an adhesive binder layer therebetween, and a longitudinal joint of the side edges of the second tape is welded.

3 Claims, 5 Drawing Figures

Fig. 1
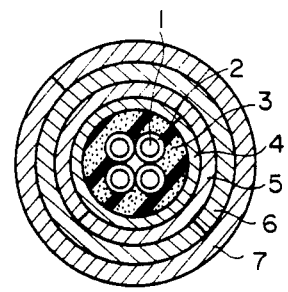
Fig. 3A  Fig. 3B  Fig. 3C
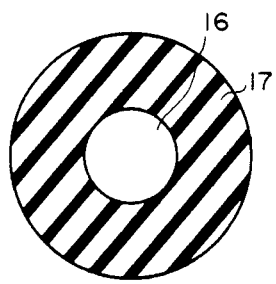 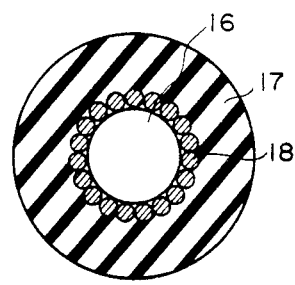 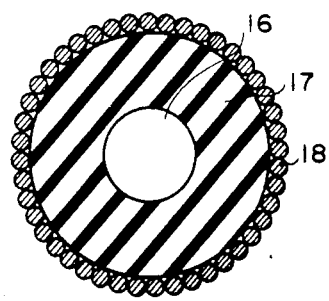

OPTICAL FIBER SUBMARINE CABLE

This is a continuation of application Ser. No. 024,674, filed Mar. 28, 1979, now abandoned.

BACKGROUND OF THE INVENTION

This invention relates to an optical fiber submarine cable structure in the field of optical communication employing low-loss optical fibers as transmission media.

As an optical fiber is made of a glass or silica material and is a very fine thread, it is given a coating for increased tensile strength necessary for use in a cable form and for protection against external forces. The surface of this coating has fine unevenness; therefore, when the optical fiber is exposed to an external force, such as static hydraulic pressure, a force applied to the optical fiber in its diametrical direction becomes nonuniform with respect to its lengthwise direction, causing slight bending of the optical fiber. This exerts a bad influence upon the transmission characteristic of the optical fiber to increase a transmission loss. In a case where such an optical fiber is laid on the seabed of several thousand meters as an optical fiber submarine cable, the abovesaid static hydraulic pressure attains up to several hundred atmospheres; and in addition to a problem of the coating of the optical fiber, it is a serious problem whether or not a stable transmission characteristic can be maintained for such a long time such as more than 20 years. In view of the above, various pressure resisting layers have heretofore been proposed for protecting the optical fiber from high hydraulic pressures in submarine cable structures.

The present inventors have previously proposed a small-diametered, thin pipe based on the small diameter of the optical fiber or a pressure resisting layer of such a construction in which grooves are formed in a metal columnar structure and closely covered with a lid, or in which divided thick cylindrical members are assembled together so that the pressure resisting layer is used to perform not only its own function but also the function of a power-feeding member or a tension member. In any of these proposed structures, cylindrical members are divided into segments and, for maintaining airtightness of the pressure resisting cylindrical structure over such a long distance as a few dozen kilometers, a high degree of material working technique is required and the manufacture of the pressure resisting layer is difficult.

SUMMARY OF THE INVENTION

An object of the invention is to settle such problems and to provide an optical fiber submarine cable which employs a multilayer, cylindrical high-pressure resisting layer which is easy of continuous fabrication and has a high degree of air-tightness.

To attain the above objects of this invention, there is provided an optical fiber submarine cable having a multilayer, cylindrical pressure resisting layer comprising: at least one optical fiber; a cushion layer closely covering on said at least one optical fiber; a rounded layer of a first tape of a good electric conductor material for closely covering on said cushion layer, a longitudinal joint of side edges of said first tape being welded; and at least one second tape of a good electric conductor material closely coated on the layer of said first tape by the use of an adhesive binder layer therebetween, a longitudinal joint of side edges of said second tape being welded.

BRIEF DESCRIPTION OF THE DRAWINGS

The present invention will be hereinafter described in detail with reference to the accompanying drawings, in which:

FIGS. 1, 3A, 3B and 3C are cross-sectional views each illustrating an embodiment of the present invention.

DESCRIPTION OF THE PREFERRED EMBODIMENTS

Figure 2:
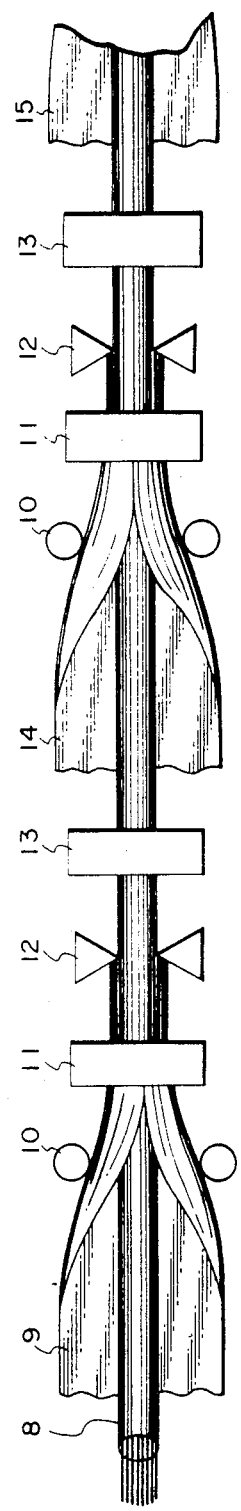
FIG. 2 is a plan view explanatory of a method for manufacturing an optical fiber submarine cable of the present invention.

With reference to FIG. 1, reference numeral 1 indicates optical fibers. Reference numeral 2 designates a primary coating which mainly prevents the growth of flaws liable to occur in the surface of the optical fiber and provides a tensile strength needed for handling of the optical fiber, and this coating is given as thin as possible. Reference numeral 3 identifies a cushion layer, which is closely covering the optical fibers and made of a material, such as polyethylene silicone rubber or the like. In the formation of the cushion layer 3, it is desirable to provide first a primary cushion of silicone rubber or the like of a small thickness on the primary coating 2 and then a secondary cushion of a soft material, such as polyethylene or the like. The reason for this is that the thermal expansion coefficients of the cushion material and the optical fiber differ from each other by one to two orders of magnitude; therefore, the thickness of the cladding must generally be minimized. In a case of forming a coated optical fiber of a certain outer diameter with four optical fibers bundled as in the present embodiment, however, the thickness of the cladding is inevitably large at some positions in its circumferential direction, so that it is necessary to employ the two-layer cushion structure so as to minimize the influence of the outer thick cushion.

A member having one or more optical fibers housed in one cladding, as mentioned above, will hereinafter be referred to as the "composite optical fibers". A thin-sheet tape 4 of copper, aluminum or like material is closely wound around the composite optical fibers and a longitudinal joint of the tape 4 is welded over the entire length of the composite optical fibers, and the composite optical fibers are drawn to such an extent as not to be applied a large force, thereby making the metal cylindrical member so that the composite optical fibers come closely into contact without an air gap therebetween. By the same process, another metal cylindrical member is further formed in close contact with the outside surface of the metal cylindrical member having housed therein the composite optical fibers. This is indicated by reference numeral 5 in FIG. 1, and metal cylindrical members similarly formed are indicated by reference numerals 6 and 7. In FIG. 1, a multilayer, pressure resisting layer is formed with four metal cylindrical members. The cushion layer 3 has a radius which is substantially equal to the combined thickness of metallic layers 4, 5, and 6 forming the multi-layer metallic tubular unitary structure.

By uniformly coating an adhesive binder between these metal cylindrical members, the multilayer metal cylindrical members can be formed as a unitary structure to provide for enhanced pressure resisting strength. The longitudinal joints of side edges of the metal tapes are each welded over the entire length of each tape;

and, by making the positions by the joints random among the metal cylindrical layers in the radial direction of the pressure resisting layer, it is possible to compensate for incomplete welding of any one of the layers.

Further, when the thickness of the tape is constant, since the larger the inner diameter is, the easier the forming becomes; therefore, it is also possible to decrease the number of layers in the formation of the multilayer cylindrical pressure resisting layer of the same thickness by increasing the thickness of the tape towards the outside surface of the pressure resisting layer.

FIG. 2 illustrates an embodiment of the fabrication of the multilayer pressure resisting layer of this invention. In FIG. 2, reference numeral 8 indicates the composite optical fibers composed of one or more optical fibers; 9 designates a metal tape of a first layer; 10 identifies a forming roller; 11 denotes a welder for continuously welding a longitudinal joint of side edges of the rounded tape; 12 represents a die for limiting the outer diameter to a constant value during the drawing; and 13 shows an adhesive binder tank for uniformly coating an adhesive binder between the first layer and the second layer. Reference numeral 14 refers to a metal tape of the second layer; and 15 indicates a metal tape for a third layer. Similar apparatus equal in number to the layers are arranged tandem, by which is continuously manufactured the multilayer, cylindrical pressure resisting layer of this invention. It is also possible to separate the process for each layer so as to make a close check of each layer being manufactured.

FIGS. 3A, 3B and 3C show examples of optical fiber submarine cables employing the multilayer, cylindrical pressure resisting layer of the present invention.

In FIG. 3A, reference numeral 16 indicates a multilayer pressure resisting layer having housed therein optical fibers, corresponding to the pressure resisting layer shown in FIG. 1. The pressure resisting layer has, in addition to its own function, the functions of both of a power feeding member and a tension member and is covered with a jacket 17 of polyethylene or a like material for insulation and protection against external forces.

In FIG. 3B, a tension member 18 is disposed on the outside of the multilayer pressure resisting layer 16 and the function of a power feeding member is performed by the multilayer pressure resisting layer 16 and the tension member 18. This is a construction which is employed when no tensile strength can be provided by the pressure resisting layer alone.

The structure of FIG. 3C is used for protecting the cable from external forces by anchoring or fishing operations. The multilayer, cylindrical pressure resisting layer 16 also serves as a power feeding member while the tension member 18 is placed on the outside of the insulating layer 17.

As described above, according to this invention, a pressure resisting layer having the same characteristics as a thick, cylindrical pressure resisting layer which is difficult to fabricate for use with an optical fiber, is produced as a multilayer, cylindrical structure which ensures excellent close contact between individual layers, by which it is possible to facilitate continuous fabrication of the pressure resisting layer while incorporating therein an optical fiber or fibers. Consequently, it is possible to realize a highly reliable and economical optical fiber submarine cable.

What we claim is:

1. An optical fiber submarine cable having a multilayer, cylindrical pressure-resisting layer comprising: at least one optical fiber extending longitudinally; a two-layer cushion layer closely directly covering said at least one optical fiber; said two-layer cushion consisting of a primary thin cushion of elastic material directly covering said fiber and a thicker secondary cushion of soft material, the primary cushion being of a different composition than the secondary cushion material, a cylindrical, tubular multi-layer pressure-resisting layer comprising a first elongated, folded tape of a good electric conductor metallic material folded longitudinally for closely directly, circumferentially covering said cushion layer, a longitudinal joint of side edges of the folded metal first tape being welded; a second tape of a good electric conductor metallic material folded longitudinally closely directly circumferentially covering the layer constituting said first tape and adhered thereto by the use of an adhesive binder layer therebetween; a longitudinal joint of said edges of the longitudinally folded second metallic second tape being welded, the longitudinal welded side edges of the longitudinal joints of the first and second tapes being out of registry, the second metallic tape being thicker than the first metallic tape, a third tape of a good electric conductor metallic material covering and adhered to the second tape and folded longitudinally, a longitudinal joint of side edges of the folded metal third tape being welded and being out of registry with the welds of the first and second tapes, the adhered first, second and third tapes defining a unitary tubular structure and the radius of said cushion layer being substantially equal to the combined thickness of the three of said tapes.

2. An optical fiber submarine cable according to claim 1, including one more metallic longitudinally folded tape adhered to said third tape for defining the multi layer pressure-resisting layer, and wherein the thickness of all the tapes of respective layers of the cylindrical pressure-resisting layer increase towards the outer periphery of the pressure-resisting layer.

3. An optical fiber submarine cable according to claim 1, wherein the cylindrical pressure resisting layer is a power feeding member and a tension member.

* * * * *